E. G. Bullis.
Grain-Fork.

Nº 71971. Patented Dec. 10, 1867.

Witnesses.

Inventor.

United States Patent Office.

E. G. BULLIS, OF MANCHESTER, IOWA, ASSIGNOR TO CHARLES J. RIGGS, OF SAME PLACE, AND SAID RIGGS ASSIGNOR TO D. E. LYON, OF DUBUQUE, IOWA.

Letters Patent No. 71,971, dated December 10, 1867.

IMPROVEMENT IN GRAIN-FORKS.

The Schedule referred to in these Letters Patent and making part of the same.

TO ALL WHOM IT MAY CONCERN:

Be it known that I, E. G. BULLIS, of Manchester, in the county of Delaware, and State of Iowa, have invented a new and useful Improvement in Grain-Band Cutter and Fork; and I do hereby declare that the following is a full, clear, and exact description thereof, which will enable others skilled in the art to make and use the same, reference being had to the accompanying drawings, forming a part of this specification, in which—

Similar letters of reference indicate corresponding parts.

My invention has for its object to furnish an improved instrument, by means of which the bands of grain-bundles may be cut at the same time that the bundles are pitched to the person who feeds them to the threshing-machine, and by the same operation; and it consists in the construction, combination, and arrangement of the various parts, as hereinafter more fully described.

Figure 1:
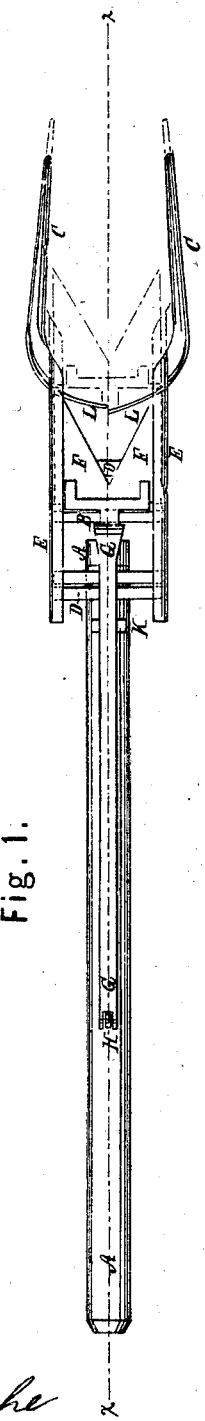
Figure 1 is a side view of my improved grain-band cutter and fork, and showing in red lines the position of the knife or cutter when pushed forward.
Figure 2:
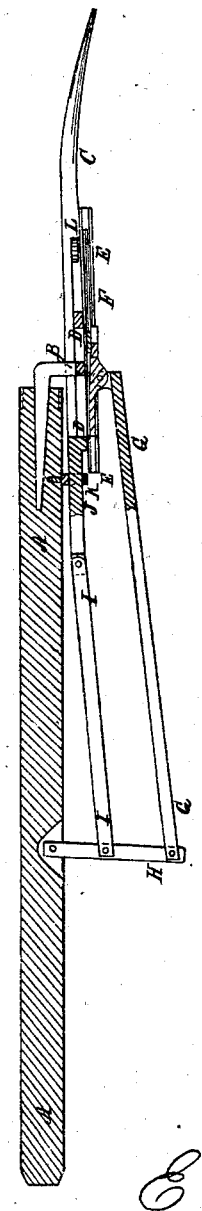
Figure 2 is a longitudinal section of the same, taken through the line $x$ $x$, fig. 1.

A is the handle of the fork; B is a cross-head, the spike or shank of which is driven into or otherwise securely attached to the end of the handle A; C are the fork-tines, which are prolonged rearward, and the rear parts of which are connected by two cross-bars D, which form stops to limit the movement of the fork-head upon the cross-head B; E are metallic bars, grooved upon their inner sides, and which are securely attached to the cross-bars D, and to the tines C, leaving spaces for the ends of the cross-head B to slide back and forth in; F is the cutter, the forward or cutting-end of which is made V-shaped, as shown in fig. 1, and the outer edges of which slide back and forth in the grooves of the bars E. To the shank of the cutter F is pivoted the end of the connecting-bar G, the other end of which is pivoted to the outer end of the bar or arm H, the other or inner end of which is pivoted to the middle part of the handle A. To the middle part of the bar or arm H is pivoted the end of the bar I, the forward end of which is jointed to the rear end of the shank J of the fork-head. The shank J of the fork-head slides back and forth along the handle A, being kept in proper relative positions by the keeper K.

By this construction, as the fork-head moves forward, in pitching the bundle of grain from the fork, drawing the projecting end of the arm or bar H forward, the cutter F is forced forward farther than the fork-head, and with greater velocity.

L are two springs or elastic arms, the outer ends of which are securely attached to the tines C, and the free ends of which are curved and pass inward through the spaces between the forward parts of the grooved bars E and the extended parts of the tines C, into such a position that, when the fork is thrust into a bundle of grain, one tine being placed upon each side of the band, the said band will pass between the ends of the springs L, forcing the cutter F back. Then, as the bundle is thrown from the fork-head, the springs L retain the band, causing the bundle to draw the fork-head forward, thrusting the cutter F forward against the band, cutting it, and delivering the bundle to the person who feeds the threshing-machine with its band cut ready for use; the cutter thus acting automatically.

The cutting-edges of the cutter F may be made smooth, as shown in the drawings, or they may be made serrated or sickle-edged. This latter construction I prefer, as it takes a better hold upon the band being cut.

I do not limit or confine myself to the particular arrangement or construction of the parts herein shown, as they may be changed in various ways without departing from my invention.

Having described my improvement, I claim, and desire to secure by Letters Patent—

1. The combination of a band-cutting device with a pitching-fork, substantially as and for the purposes described.

2. The combination of the rearwardly-extended parts of the tines C, the cross-head B, grooved bars E, sliding cutter F, and springs L, with each other, substantially as herein shown and described, and for the purpose set forth.

3. The combination of the pivoted or jointed bars G H I with the sliding cutter F, shank J of the fork-head, and handle A, substantially as herein shown and described, and for the purpose set forth.

The above specification of my invention signed by me, this 20th day of August, 1867.

E. G. BULLIS.

Witnesses:
MICHAEL EGAN,
J. A. WHEELER.